(12) United States Patent
Suefuji et al.

(10) Patent No.: US 8,523,982 B2
(45) Date of Patent: Sep. 3, 2013

(54) SEPARATION MEMBRANE MODULE AND FUEL VAPOR PROCESSING APPARATUS EQUIPPED WITH THE SAME

(75) Inventors: Takashi Suefuji, Toyota (JP); Masataka Suzuki, Obu (JP); Akio Muraishi, Aichi-ken (JP); Shota Yamanaka, Hekinan (JP); Yohsuke Koizumi, Kawasaki (JP); Hiroyoshi Ohya, Fuji (JP); Hirokazu Ohno, Kawasaki (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 306 days.

(21) Appl. No.: 12/958,562

(22) Filed: Dec. 2, 2010

(65) Prior Publication Data
US 2011/0146491 A1 Jun. 23, 2011

(30) Foreign Application Priority Data
Dec. 2, 2009 (JP) .................................. 2009-274188

(51) Int. Cl.
*B01D 53/22* (2006.01)

(52) U.S. Cl.
USPC .................... 96/8; 95/45; 95/47; 95/54; 96/7; 96/10

(58) Field of Classification Search
USPC ................ 95/45, 47, 54; 96/7, 8, 10
See application file for complete search history.

(56) References Cited

U.S. PATENT DOCUMENTS

| 3,144,313 | A | * | 8/1964 | Pfefferle | ............................ 95/56 |
| 4,857,081 | A | * | 8/1989 | Taylor | ................................ 95/52 |
| 6,447,679 | B1 | * | 9/2002 | Watari et al. | ............. 210/500.23 |
| 6,653,012 | B2 | * | 11/2003 | Suzuki et al. | .................. 429/413 |
| 8,241,502 | B2 | * | 8/2012 | Watari et al. | .................. 210/650 |
| 2001/0003949 | A1 | * | 6/2001 | Monereau et al. | ................. 95/55 |
| 2005/0214613 | A1 | * | 9/2005 | Sarkar et al. | .................... 429/31 |
| 2010/0107877 | A1 | * | 5/2010 | Suzuki et al. | ........................ 96/6 |

FOREIGN PATENT DOCUMENTS

| JP | 05 184812 | | 7/1993 |
| JP | 07 096152 | | 4/1995 |
| JP | 09000889 | A * | 1/1997 |
| JP | 10 296005 | | 11/1998 |
| JP | 2000 093729 | | 4/2000 |
| JP | 2002-102640 | | 4/2002 |
| JP | 2003 314378 | | 11/2003 |
| JP | 2004 050042 | | 2/2004 |
| JP | 2004 324488 | | 11/2004 |
| WO | WO 9401207 | A1 * | 1/1994 |

OTHER PUBLICATIONS

JP 09-000889 machine translation, Jan. 7, 1997.*

* cited by examiner

*Primary Examiner* — Jason M Greene
*Assistant Examiner* — Anthony Shumate
(74) *Attorney, Agent, or Firm* — Ladas & Parry, LLP

(57) ABSTRACT

A separation membrane module for separating a specific component from a mixture containing a plurality of components includes a plurality of separation stages each including a plurality of hollow fiber membranes arranged in parallel to each other. The separation stages are connected in series via connection portions allowing passage of the mixture. At lease one parameter relating to separation by the hollow fiber membrane or membranes in each separation stage is determined to provide effective separation throughout the separation stages.

5 Claims, 7 Drawing Sheets

SEPARATION MEMBRANE MODULE AND FUEL VAPOR PROCESSING APPARATUS EQUIPPED WITH THE SAME

This application claims priority to Japanese patent application serial number 2009-274188 the contents of which are incorporated herein by reference.

BACKGROUND OF THE INVENTION

1. Field of the Invention

The present invention relates to separation membrane modules for separating a specific component from a mixture containing a plurality of components. The present invention also relates to fuel vapor processing apparatus using the separation membrane modules.

2. Description of the Related Art

There has been applied to various fields of industry separation membranes capable of separating and recovering a specific component from a mixed gas containing a plurality of components mixed together or from a liquid in which a gas component is dissolved by utilizing a difference in dissolution or diffusion coefficient, etc. with respect to a polymer membrane. In general, a separation membrane has a structure M which a separation layer is layered on a porous support body, and a plurality of separation Membranes are arranged into a hollow case to form a separation membrane module. The hollow case has an introduction port through which an object of processing is introduced, a recovery port through which a specific component separated by a hollow fiber membrane is recovered, and a discharge port through which the residual component not transmitted through the hollow fiber membrane is discharged. For example, there is a hollow fiber membrane in which a separation layer is stacked on the inner surface or outer surface of a hollow fiber as a support body. And, as examples of a technique in which an improvement in terms of separation performance is achieved by the hollow fiber membrane, Japanese Laid-Open Patent Publication Nos. 5-184812, 2000-93729, 7-96152 and 10-296005 are known.

In the hollow fiber membrane module disclosed in the Publication Nos. 5-184812 and 2000-93729, there is used an inner pressure type separation membrane in which the object of processing is introduced into a hollow fiber membrane to separate a specific component through transmission to the exterior of the hollow fiber membrane via a separation layer; a conventional elongated hollow fiber membrane is divided into a plurality of hollow fiber membranes, which are connected in series, and a turbulent flow is generated at each connecting portion while reducing a pressure on the outside of each hollow fiber membrane, thereby achieving an improvement in terms of separation performance. In the hollow fiber membrane module disclosed in the Publication No. 7-96152, there is used an outer pressure type separation membrane in which a specific component is separated through transmission to the interior of a hollow fiber membrane via a separation layer from the exterior of the hollow fiber membrane; the inner diameter of the hollow fiber is gradually changed, or the thickness of the separation layer is gradually changed from a closed one end toward the other end (terminal end) serving as an outlet, whereby reduction in difference in specific component transmission amount per unit area is achieved, thereby achieving an improvement in terms of separation performance. More specifically, the inner diameter is gradually increased while keeping the membrane thickness uniform, or the membrane thickness is gradually increased while keeping the inner diameter uniform, or the membrane thickness is gradually increased while gradually reducing the inner diameter. In the case of an inner pressure type separation membrane, the inner diameter is gradually reduced from both ends toward the central portion in the longitudinal direction. In the Publication No. 10-296005, two or more kinds of hollow fiber membrane modules differing in gas transmission characteristic are connected in series, and a first stage degassing is effected through reduction in pressure in a first separation membrane module of higher oxygen transmission speed at a pressure higher than that of steam; then, the resultant degassed water is subjected to pressure reduction degassing at a pressure lower than that of steam in a second separation membrane module of low oxygen transmission speed and low steam transmission speed, thereby producing ultra-degassed water with high efficiency by using a vacuum pump of small capacity.

On the other hand, there exists an fuel vapor processing apparatus in which fuel vapor obtained through evaporation of gasoline stored in a fuel tank is temporarily retained through adsorption by a canister so that it may not be dissipated into the atmosphere and in which the fuel vapor is separated from the canister to be recovered in the fuel tank; to enhance the recovery efficiency, a separation membrane module is incorporated into this fuel vapor processing apparatus. Examples of such a fuel vapor processing apparatus are disclosed in Publication Nos. 2004-50042 and 2004-324488. In the Publication No. 2004-50042, reduction in pressure is effected in a canister by a pneumatic pump, and a gas containing separated fuel vapor is sent under pressure to a separation membrane module, whereby the fuel vapor, which is the specific component, is recovered in the fuel tank through condensation. The technique disclosed in the Publication No. 2004-324488 is an improvement over the Publication No. 2004-50042 to process fuel vapor with still higher efficiency, and recovery is performed while effecting separation at a plurality of stages by using a plurality of separation membrane modules. In the Publication Nos. 2004-50042 and 2004-324488, a flat separation membrane is used.

In the known art, for separating a specific component through transmission with high efficiency by an inner pressure type hollow fiber membrane, there is a general tendency to make the hollow fiber membrane relatively long in order to increase the length of time that the component is held in contact with the hollow fiber membrane. The lower the concentration of the specific component on the transmission side (the space outside the hollow fiber membrane), the easier it is for the specific component to be transmitted through the separation layer. However, when the hollow fiber membrane is long, the distance from the end portion of the hollow case accommodating it to the recovery port for the specific component becomes inevitably long. Thus, the specific component transmitted at the start end (inlet) portion and the terminal end (outlet) portion of the hollow fiber membrane is not easily discharged through the recovery port; the farther from the recovery port, the higher the concentration of the specific component in the transmission side space, resulting in reduction in separation efficiency. Further, there is a possibility that the specific component transmitted at the start end portion of the hollow fiber membrane is diffused to the terminal end (outlet) portion beyond the recovery port.

In this regard, in the Publication Nos. 5-184812 and 2000-93729, the hollow fiber membranes are connected in series, so that it is possible to generally increase the length of time that the specific component is held in contact with the hollow fiber membranes without making each hollow fiber membrane long. Further, at each connecting portion, it is possible to prevent diffusion of the specific component from the inlet side to the outlet side of the module. In this case, however, the conditions (atmosphere) acting on the hollow fiber membranes at different stages are different from each other. More specifically, the more downstream, the lower the concentration, flow rate, etc. of the specific component in the object of processing, with the separation efficiency being reduced gradually. However, in the Publication Nos. 5-184812 and 2000-93729, the same hollow fiber membrane is used and the specific component is transmitted under the same condition for the different stages, and therefore, the efficiency is low.

On the other hand, in the Publication No. 7-96152, the difference in specific component transmission amount per unit area is reduced by gradually changing the inner diameter, thickness, etc. of the hollow fiber membranes, so that the above problem in the Publication Nos. 5-184812 and 2000-93729 can be mitigated. It should be noted, however, that, in the Publication No. 7-96152, the inner diameter, thickness, etc. are only varied in a single hollow fiber membrane, and, in order to increase the length of time that the specific component is held in contact with the hollow fiber membrane, there is nothing for it but to increase the length of the membrane. That would involve the same problem as mentioned above. Further, in the Publication No. 7-96152, use of an outer pressure type separation mode is a prerequisite, and the inner diameter, etc. are gradually changed from one end to the other end; and thus, this idea cannot be applied as it is to an inner pressure type separation configuration. In fact, in the case of the inner pressure type separation configuration, variation is effected from both ends toward the central portion in the longitudinal direction; thus, it is impossible to solve the problem that the more downstream, the lower the concentration, flow rate, etc. of the specific component in the object of processing.

In the Publication No. 10-296005, the reduction in pressure is effected to a great degree on the upstream transmission side, and the reduction in pressure is effected on the downstream side to a smaller degree than on the upstream side. However, in the Publication No. 10-296005, separation membrane modules of different kinds are simply connected together, and the pressure reduction force is set accordingly, which means the pressure reduction force is not set taking into account the problems inherent in the configuration of the hollow fiber membranes and changes in the thickness thereof.

In the fuel vapor processing apparatus of the Publication No. 2004-50042, there is provided only one flat separation membrane module, so that the fuel vapor recovery efficiency of the apparatus cannot be regarded as high. On the other hand, in the fuel vapor processing apparatus of the Publication No. 2004-324488, a plurality of separation membrane modules are provided, and fuel vapor is separated at a plurality of stages, so that an improvement in terms of recovery efficiency is attained. However, providing a plurality of separation membrane modules leads to increase in the size of the apparatus. Further, this also involves a rather complicated piping route, which also leads to increase in the size of the apparatus.

Therefore, there is a need in the art for a separation membrane module that can effectively separate a specific component from a mixture of a plurality of components.

SUMMARY OF THE INVENTION

A separation membrane module for separating a specific component from a mixture containing a plurality of components includes a plurality of separation stages each including a plurality of hollow fiber membranes arranged in parallel to each other. The separation stages are connected in series via connection portions allowing passage of the mixture. At lease one parameter relating to separation by the hollow fiber membrane or membranes in each separation stage is determined to provide effective separation throughout the separation stages.

DETAILED DESCRIPTION OF THE INVENTION

Figure 1:
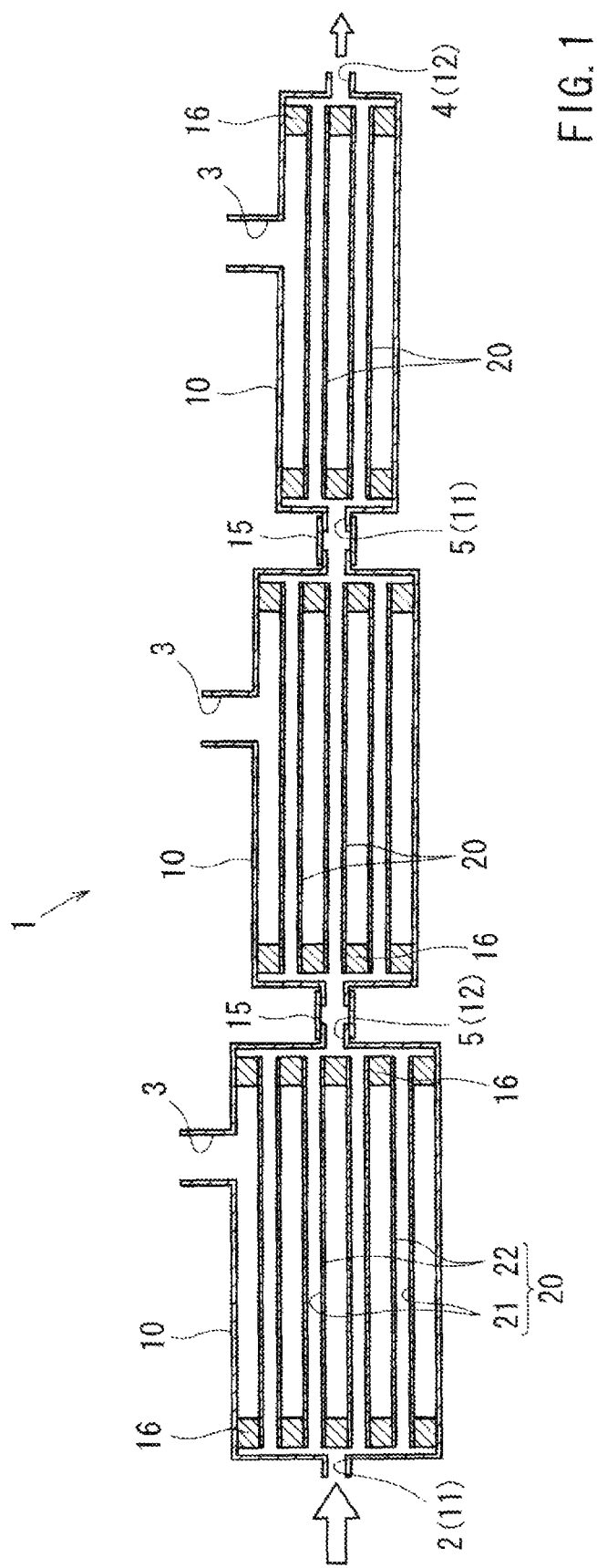
FIG. 1 is a schematic sectional view of a separation membrane module according to a first example.

Each of the additional features and teachings disclosed above and below may be utilized separately or in conjunction with other features and teachings to provide improved separation membrane modules and fuel vapor processing apparatus having such separation membrane modules. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one example, a separation membrane module for separating a specific component from a mixture containing a plurality of components includes a plurality of separation stages each including a plurality of hollow fiber membranes arranged in parallel to each other. The separation stages are connected in series via at least one connection portion allowing passage of the mixture. The mixture is successively introduced into a hollow portion of each hollow fiber membrane of each separation stage, so that the specific component is separated from the mixture as the specific component transmits through each hollow fiber membrane from an interior to an exterior of each hollow fiber membrane. The number of the hollow fiber membranes of each separation stage is determined to be larger than the number of the hollow fiber membranes of the other separation stage located just on its downstream side with respect to a direction of flow of the mixture through the separation stages. In other words, the number of the hollow fiber membranes decreases gradually in a direction from the inlet side (e.g., an introduction port provided at the separation membrane module) toward the outlet side (e.g., a discharge port provided at the separation membrane module).

In this case, although it may be possible to also vary gradually the inner diameter and/or the thickness of the hollow fiber membranes in a direction from the inlet side toward the outlet side, the inner diameter and the thickness of the hollow fiber membranes may be the same throughout the separation stages.

In another example, an inner diameter of the hollow fiber membranes of each separation stage is determined to be larger than the inner diameter of the hollow fiber membranes of the other separation stage located just on its downstream side with respect to a direction of flow of the mixture through the separation stages. In other words, the inner diameter of the hollow fiber membranes decreases gradually in a direction from the inlet side toward the outlet side. In this case, although it may be possible to also vary gradually the number and/or the thickness of the hollow fiber membranes in a direction from the inlet side toward the outlet side, the number and the thickness of the hollow fiber membranes may be the same throughout the separation stages.

In a further example, a thickness of the hollow fiber membranes of each separation stage is determined to be smaller than the thickness of the hollow fiber membranes of the other separation stage located just on its downstream side with respect to a direction of flow of the mixture through the separation stages. In other words, the thickness of the hollow fiber membranes increases gradually in a direction from the inlet side toward the outlet side. In this case, although it may be possible to also vary gradually the number and/or the inner diameter of the hollow fiber membranes in a direction from the inlet side toward the outlet side, the number and the inner diameter of the hollow fiber membranes may be the same throughout the separation stages.

A negative pressure may be applied to the exterior of each of the hollow fiber membranes in each separation stage. In the case of the example where the number or the inner diameter of the hollow fiber membrane is varied, it may be preferable that the negative pressure applied at each of the separation stages is larger than the negative pressure applied at the other separation stage located just on its downstream side. In other words, the negative pressure gradually decreases from the upstream side toward the downstream side. In the case of the example where the thickness of the hollow fiber membrane is varied, it may be preferable that the negative pressure applied at each of the separation stages is smaller than the negative pressure applied at the other separation stage located just on its downstream side. In other words, the negative pressure gradually increases from the upstream side toward the downstream side.

In a further example, a fuel vapor processing apparatus includes the separation membrane module of any one of the above examples and further includes a canister capable of adsorbing fuel vapor generated in a fuel tank, a vapor path communicating between the fuel tank and the canister; a recovery path for recovering fuel vapor desorbed from the canister into the fuel tank, and a pressure reduction unit provided in the recovery path and configured to reduce pressure within the canister for desorbing the fuel vapor from the canister. The separation membrane module separates fuel vapor as the specific component from a fuel vapor containing air, so that the fuel vapor is recovered into the fuel tank in a condensed state.

The fuel tank may be provided with a suction port for introducing fuel vapor generated in the fuel tank while fuel vapor is being desorbed from the canister. The separation membrane module may include an introduction port through which a fuel vapor containing gas is introduced, a recovery port for recovering the fuel vapor separated by the hollow fiber membranes, and a discharge port for discharging a residual air component that has not been transmitted through the hollow fiber membranes. The introduction port of the separation membrane module may communicate with the suction port. The recovery port of the separation membrane module may communicate with the recovery path. The discharge port of the separation membrane module may communicate with the canister. The fuel vapor separated by the separation membrane module may be recovered in the fuel tank via the recovery path while a pressure reduction force of the pressure reduction unit is applied to the exterior of each hollow fiber membrane of the separation membrane module, whereas the air component discharged from the discharge port of the separation membrane module is supplied to the canister.

According to the separation membrane of the above examples, a plurality of hollow fiber membranes are connected in series, so that it is possible to increase the period of time that the specific component is in contact with the hollow fiber membranes from the introduction port (inlet) to the discharge port (outlet) of the separation membrane module without prolonging each hollow fiber membrane. As a result, it is possible to reduce the amount of specific component that is not separated, making it possible to achieve an improvement in terms of separation efficiency. Further, since it is possible to suppress increase in the length of each hollow fiber membrane, the distance from the end portion of each hollow fiber membrane to the recovery port is reduced, and it is also possible to properly recover the specific component transmitted at the end portion of each hollow fiber membrane. Furthermore, it is possible to prevent concentration of the specific component on the end portion outer side of each hollow fiber membrane from becoming higher than that in the other portions, making it possible to suppress unevenness in separation efficiency in the length direction of each hollow fiber membrane. Further, the specific component separated at each separation stage can be recovered at that separation stage, so that it is possible to reliably prevent diffusion to the discharge port side of the specific component separated on the introduction port side.

In particular, in the case of the example of the separation membrane module, in which the number of hollow fiber membranes is reduced gradually from the upstream side toward the downstream side, the following effects can be attained. First, since the number of the hollow fiber membranes of the upstream side stage is larger than that of the downstream side, the entire contact area between the mixture and the hollow fiber membranes is large, so that the separation amount (transmission amount) per unit time is large, making it possible to quickly separate and recover the specific component. However, this results in the flow rate of the mixture being gradually reduced toward the downstream side. If the flow rate of the mixture is reduced, the inner pressure of the hollow fiber membrane may be reduced, resulting in reduction in separation efficiency. In view of this, the number of hollow fiber membranes may be reduced to correspond to the reduction in flow rate, so that the flow rate per hollow fiber membrane increases. Therefore, the number of hollow fiber membranes is preferably reduced gradually in correspondence with the gradually reduction in the flow rate of the mixture from the upstream side toward the downstream side, whereby it is possible to secure a necessary or desired separation efficiency from the introduction port to the discharge port of the separation membrane module, making it possible to efficiently separate the specific component.

In the case of the example of the separation membrane module in which the inner diameter of the hollow fiber membrane is reduced gradually from the upstream side toward the downstream side, the following effects can be obtained. First, the basic characteristic of an inner pressure type hollow fiber membrane is that the higher the concentration of the specific component in the mixture, the more frequently the specific component and the hollow fiber membranes come into contact with each other, so that the separation efficiency per unit area is high; and, the larger the inner diameter, the less frequently the specific component and the hollow fiber membranes come into contact with each other, so that the separation efficiency per unit area is reduced. Based on this premise, the concentration of the specific component in the mixture is high on the upstream side, so that the separation efficiency per unit area is naturally high. Thus, even in the case that the inner diameter of the hollow fiber membrane is large to some extent, it is possible to secure a necessary or desired level of separation efficiency. Accordingly, by increasing the inner diameter of the hollow fiber membrane(s) of the upstream side separation stage, it is possible to secure a necessary or desired level of flow rate also to the downstream side while securing a necessary or desired separation efficiency, so that it is possible to suppress reduction in the flow rate on the downstream side and eventually reduction in the inner pressure (pressure loss) in the hollow portion. On the other hand, on the downstream side stage, the concentration of the specific component in the mixture is reduced to cause reduction in separation efficiency. In view of this, the inner diameter of the hollow fiber membranes may be reduced by an amount corresponding to reduction in the concentration of the specific component, whereby the density of the specific component in the mixture increases, so that it is possible to enable the specific component and the hollow fiber membranes to come into contact with each other more frequently. By utilizing this, the inner diameter of the hollow fiber membranes may be reduced gradually in correspondence with the gradually reduction in the concentration of the specific component in the mixture, whereby it is possible to secure a necessary or desired level of separation efficiency from the introduction port to the discharge port of the separation fiber membrane module, making it possible to efficiently separate the specific component.

Further, in the case of the example of the separation membrane module in which the thickness of the hollow fiber membranes is increased gradually from the upstream side toward the downstream side, the following effect can be obtained. First, the basic characteristic of a hollow fiber membrane is that the smaller the thickness of the separation layer, the larger the separation amount (transmission amount) per unit time, whereas the easier for the other components (non-specific components) to be allowed to be transmitted, resulting in reduction in separation efficiency. On the other hand, the larger the thickness of the separation layer, the smaller the separation amount per unit time, whereas the harder for the other components to be transmitted, so that it is possible to reliably separate the specific component from the other components. Based on this premise, the thickness of the hollow fiber membranes of each separation stage may be determined to be smaller than that of the hollow fiber membranes of the other separation stage located just on its downstream side, so that the separation amount (transmission amount) per unit time can be increased, making it possible to quickly recover the specific component. On the other hand, toward the downstream side, the concentration of the specific component in the mixture is reduced. In view of this, the thickness of the hollow fiber membranes may be increased by an amount corresponding to reduction in the concentration of the specific component, so that it is possible to compensate for reduction in separation efficiency. By utilizing this, the thickness of the hollow fiber membranes may be increased gradually in correspondence with reduction in the concentration of the specific component in the mixture from the upstream side to the downstream side, whereby it is possible to secure a necessary or desired level of separation efficiency from the introduction port to the discharge port of the separation membrane module, making it possible to efficiently separate the specific component.

Further, the larger the difference in pressure between the interior and exterior of the hollow fiber membrane, the easier it is to positively separate the specific component through transmission. In view of this, in the case of the example of the separation membrane module in which the number of the hollow fiber membranes or the inner diameter of the hollow fiber membranes is reduced gradually, by setting the pressure reduction force applied to the outside the hollow fiber membrane is reduced gradually from the upstream side toward the downstream side, the pressure reduction force or the negative pressure becomes maximum on the most upstream side, so that the specific component is transmitted most positively on the most upstream side, making it possible to efficiently recover the specific component.

On the other hand, the larger the thickness of the hollow fiber membrane, the harder the specific component can transmit through the hollow fiber membrane. In view of this, in the case of the example of the separation membrane module in which the thickness of the hollow fiber membrane is reduced gradually, the pressure reduction force or the negative pressure applied to the outside of the hollow fiber membrane is increased gradually from the upstream side toward the downstream side, whereby it is possible to compensate for the problem causing by increasing gradually the thickness of the hollow fiber membrane, so that it is possible to recover the specific component more efficiently.

According to the example of the fuel vapor processing apparatus having any one of the examples of the separation membrane modules, it is possible to efficiently separate fuel vapor and recover it in the fuel tank.

Various examples will now be described with reference to the drawings. The examples relate to separation membrane modules for separating a specific component from a mixed gas containing a plurality of components mixed together or from a liquid in which a gas component is dissolved by utilizing a difference in dissolution or diffusion coefficient, etc.

FIRST EXAMPLE

As shown in FIG. 1, according to a first example, a separation membrane module 1 has a basic construction in which a plurality of hollow fiber membranes 20 are arranged in a hollow case 10. More specifically, a plurality of hollow cases 10 are connected in series, and a plurality of hollow fiber membranes 20 are arranged in each hollow case 10. The separation membrane module 1 is equipped with an introduction port 2 through which an object of processing or a mixture containing a specific component is introduced, recovery ports 3 through which the specific component separated from the mixture is recovered, and a discharge port 4 through which the other components allowed to pass without being separated are discharged. The hollow cases 10 are connected together via connection ports 5.

In this example, each hollow case 10 has an introduction port 11 serving as an inlet, the recovery port 3, and a discharge port 12 serving as an outlet, and the hollow cases 10 are connected to each other by means of joint pipes 15, with the discharge port 12 of each hollow case 10 being opposed to the introduction port 11 of the other hollow case 10 positioned on the downstream side. Thus, the introduction port 11 of the hollow case 10 situated most upstream serves as the introduction port 2 of the separation membrane module 1, and the discharge port 12 of the hollow case 10 situated most downstream serves as the discharge port 4 of the separation membrane module 1. Plural sets of the introduction port 11 and the discharge port 12 connecting two adjacent hollow cases 10 by the joint pipe 15 constitute the connection ports 5 of the separation membrane module 1. The portions where the connection ports 5 are connected together by the joint pipes 15 serve as connection portions, and the hollow fiber membranes 20 in the hollow cases 10 are connected in series via the connection portions allowing passage of the mixture. While in the separation membrane module 1 shown in FIG. 1 three hollow cases 10 are connected together, the number of hollow cases 10 connected may be two or four or more. Further, while FIG. 1 shows only two to four hollow fiber membranes 20, there are actually arranged ten and several to several hundred hollow fiber membranes 20. The hollow fiber membranes 20 in each hollow case 10 are arranged in parallel.

The hollow cases 10 are formed of highly airtight material, such as metal including stainless steel, glass, resin, or ceramic material. Inside each hollow case 10, a plurality of hollow fiber membranes 20 are arranged in parallel so as to extend between opposite ends in the longitudinal direction of the hollow case 10. Fixation members 16 having no or low air permeability or water permeability are inserted into opposite end portions of each hollow fiber membrane 20 and fixed in position. In front of the recover port 3 of each hollow case 10, there is provided a pressure reduction unit, such as a vacuum pump (not shown), for effecting reduction in pressure inside each hollow case 10. It is possible to provide the same number of pressure reduction units as the hollow cases 10, with each pressure reduction unit communicating with one hollow case 10, or a single pressure reduction unit may communicate with all of the hollow cases 10. From a viewpoint of reduction in size of the apparatus, energy cost, etc., it is preferable that a single pressure reduction unit communicates with all of the hollow cases 10.

Each hollow fiber membrane 20 is composed of a hollow fiber 21 serving as a porous support body, and a non-porous separation layer 22 stacked or layered on the inner or outer surface of the hollow fiber 21. It is also possible to adopt a three-layer structure in which a non-woven fabric layer is provided between the hollow fiber 21 and the separation layer 22. In this embodiment, the separation layer 22 is layered on the outer surface of the hollow fiber 21. The separation layers 22 may be formed of polymer material that can exhibit a high dissolution or diffusion coefficient with respect to the specific component, preferentially transmitting and separating the specific component from the mixture through dissolution, diffusion, and de-dissolution. Examples of a polymer forming the separation layers 22 may include a silicone rubber series polymer superior in gas permeability, such as polydimethylsiloxane or copolymer of silicone and polycarbonate, a polyolefin series polymer, such as poly-4-methylpentene-1 or linear low-density polyethylene, a fluorine containing polymer, such as perfluoroalkyl series polymer, a cellulose type polymer, such as ethyl cellulose, polyphenylene oxide, poly-4-vinyl pyridine, and an urethane series polymer. A copolymer or a mixture of any of these polymers can also be used. Selection is made from these materials according to the kind of specific component to be separated.

Examples of the material of the hollow fiber 21 serving as a porous support body, may include a polyolefin resin, such as polyimide (PI), polyetherimide (PEI), polyethersulfone (PES), polyvinylidenefluoride (PVDF), polyethylene (PE), polypropylene (PP), poly-3-methylbudene-1, and poly-4-methylpentene-1, a fluorine resin, such as polytetrafluoroethylene (PTFE), a synthetic resin such as polystyrene (PS), and a ceramic material. Above all, it is preferable to use polyimide (PI), polyetherimide (PEI), polyethersulfone (PES), or polyvinylidenefluoride (PVDF), which exhibits high solvent resistance. There is no particular limitation to the combination of the material of the separation layers 22 and the material of the hollow fibers 21; they may be different materials or the same material. The combination of the material of the separation layers 22 and the hollow fibers 21 can be selected as appropriate according to the mixture and the kind of specific component.

In the first example, the number of the hollow fiber membranes 20 of each hollow case 10 is determined to be larger than the number of the hollow fiber membranes 20 of the other hollow case 10 positioned just on its downstream side with respect to the direction of flow of the mixture through the hollow cases 10. In other words, the number of the hollow fiber membranes 20 gradually decreases in a direction of flow of the mixture through the separation stages. On the other hand, the inner diameter of the hollow fiber membranes 20, the thickness of the separation layers 22, and the pressure reduction force or the negative pressure are the same throughout the different stages or the different hollow cases 10. The inner diameter of the hollow case 10 is determined according to the number of hollow fiber membranes 20 provided in parallel. More specifically, the inner diameter of each hollow case 10 is determined to be larger than the inner diameter of the other hollow case 10 located just on its downstream side. In other words, the inner diameter of the hollow cases 10 gradually decreases in the direction of flow of the mixture.

Next, the operation of the separation membrane module 1 will be described. When the mixture containing a specific component (a liquid in which a mixed gas or a gas component is dissolved in this example) is introduced into the separation membrane module 1 via the introduction port 2, the mixture is subjected to pass through the hollow fiber membranes 20. Therefore, due to difference in transmission coefficient, the specific component in the mixture is separated into the hollow fiber membranes 20 after passing through the separation layers 22. During this process, the interior of each hollow case 10 is kept to a reduced-pressure condition or a negative pressure, so that the specific component can be positively transmitted through the separation layers 22. In this way, the separation membrane module 1 of the first example is configured as an inner pressure type hollow fiber membrane module.

First, the specific component separated into the hollow case 10 situated most upstream (at the first stage) is recovered from the recovery port 3 provided in the most upstream hollow case 10. At this stage, the concentration of the specific component in the mixture is high, and the number of hollow fiber membranes 20 is maximum, so that the entire contact area between the mixture and the hollow fiber membranes 20 is large, whereby the separation amount (transmission amount) of the specific component per unit time is large, and it is possible to quickly separate and recover the specific component. The other components, including the portion of the specific component that has not been transmitted through the hollow fiber membranes 20, flow externally of the hollow fiber membranes 20, and flow into the hollow case 10 of the next stage (on the downstream side) via the connection portion (i.e., the connection port 5 and the joint pipe 15).

During this process, because the specific component is separated and recovered on the upstream side, the flow rate of the mixture decreases gradually toward the downstream side. If the flow rate of the mixture decreases, the inner pressure of the hollow fiber membranes 20 decreases, so that the separation efficiency may be reduced. However, according to the first example, the number of hollow fiber membranes 20 is reduced gradually in correspondence with gradual reduction in the flow rate of the mixture, so that, even on the downstream side, the flow rate per hollow fiber membrane 20 can be kept to be high. In this way, the number of the hollow fiber membranes 20 provided in parallel is reduced gradually, whereby it is possible to secure a necessary or desired level of separation efficiency from the introduction port 2 to the discharge port 4 of the separation membrane module 1, making it possible to efficiently separate the specific component. The separation mechanism of each of the hollow cases 10 located on the downstream side of the most upstream hollow case 10 is the same as the separation mechanism of the most upstream hollow case 10. The specific component separated at each stage is recovered from the recovery port 3 provided at each stage. The other components that have not been transmitted through the hollow fiber membranes 20 to the end are eventually discharged to the exterior of the separation membrane module 1 through the discharge port 4.

According to the separation membrane module 1 constructed as described above, plural sets of hollow fiber membranes 20 are connected in series in a plurality of stages, so that, without need of prolonging each hollow fiber membrane 20, the contact period of the specific component with the hollow fiber membranes 20 during the flow from the introduction port 2 to the discharge port 4 of the separation membrane module 1 can be extended, resulting in an improvement in terms of separation efficiency. Further, the distance from the end portion to the recovery port 3 of each hollow fiber membrane 3 is relatively short, so that it is also possible to reliably recover the specific component transmitted at the end portion of each hollow fiber membrane 20. Further, the specific component separated at each stage is recovered at that stage, and the fixation members having low air permeability and water permeability are provided between the hollow cases 10, so that it is possible to reliably prevent diffusion to the discharge port 4 side of the specific component separated on the introduction port 2 side.

Second to sixth examples will now be described with reference to FIGS. 2 to 6. These examples relate to modifications of the separation membrane module 1 of the first example. Therefore, in FIGS. 2 to 6, like members are given the same reference numerals as the first example and the description of these members will now not be repeated.

SECOND EXAMPLE

Figure 2:
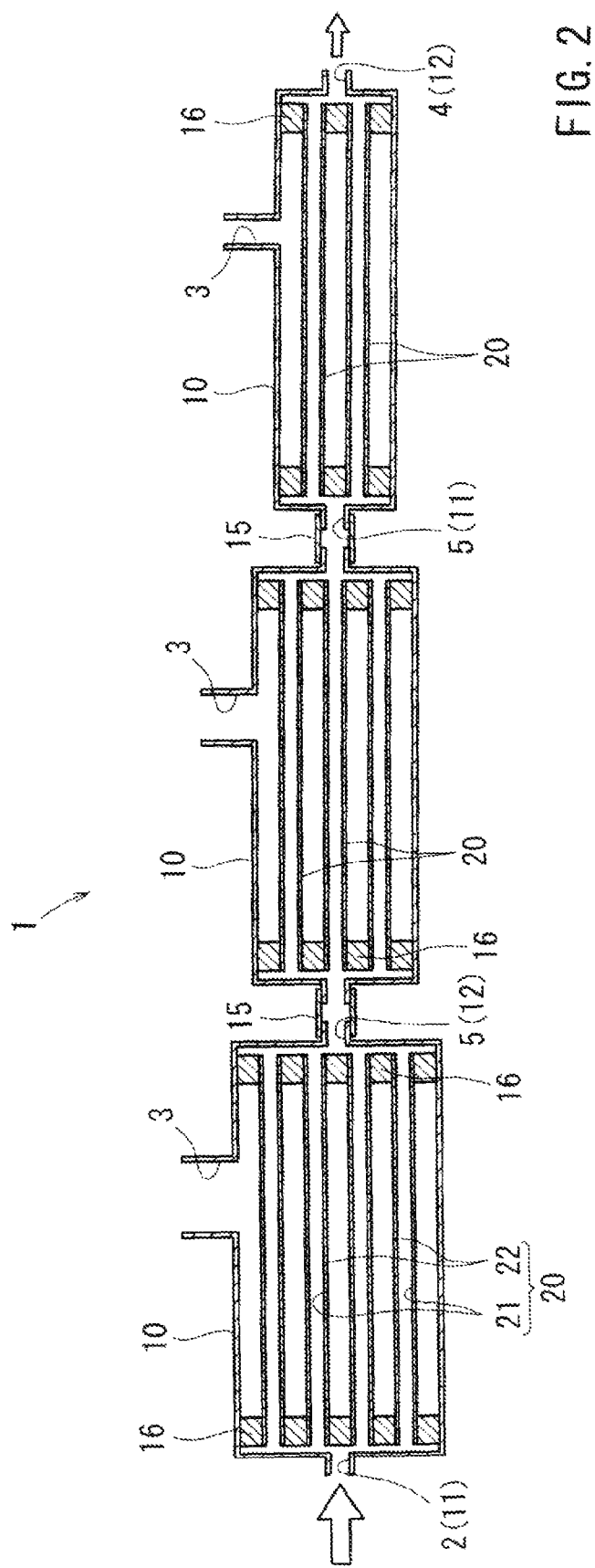
FIG. 2 is a schematic sectional view of a separation membrane module according to a second example.

FIG. 2 shows a schematic sectional view of a separation membrane module 1 according to the second example. While in the first example, the pressure reduction force or the negative pressure in the interior of the hollow cases 10 is set to be the same throughout the stages, in the second example, the pressure reduction force or the negative pressure inside each hollow cases 10 is set to be larger than the negative pressure inside the other hollow case 10 located just on its downstream side. In other words, the negative pressure applied to the hollow cases 10 gradually decrease in the direction of flow of the mixture. Although there may be various methods of reducing the pressure in the hollow cases 10 gradually, in the second example, a single pressure reduction unit (not shown) communicates with all of the hollow cases 10, and as shown in FIG. 2, the inner diameter of the recovery port 3 of each of the hollow cases 10 is determined to be larger than the inner diameter of the recovery port 3 of the other hollow 10 located just on its downstream side. In other words, the inner diameter of the recovery ports 3 of the hollow cases 10 is reduced gradually in the direction of flow of the mixture. In this way, in the separation membrane module 1 of the second example, the pressure reduction force or the negative pressure applied to the hollow fiber membranes 20 is reduced gradually from the upstream side (the introduction port 2 side) to the downstream side (the discharge port 4 side). Therefore, it is possible to allow the specific component to be positively transmitted on the upstream side, making it possible to recover the specific component more efficiently. Further, since the pressure reduction unit requires no large drive force, it is possible to achieve reduction in the size of the pressure reduction unit and, eventually, of the apparatus itself, and reduction in the drive cost (the energy cost). In other respect, this example is the same as the first example

THIRD EXAMPLE

Figure 3:
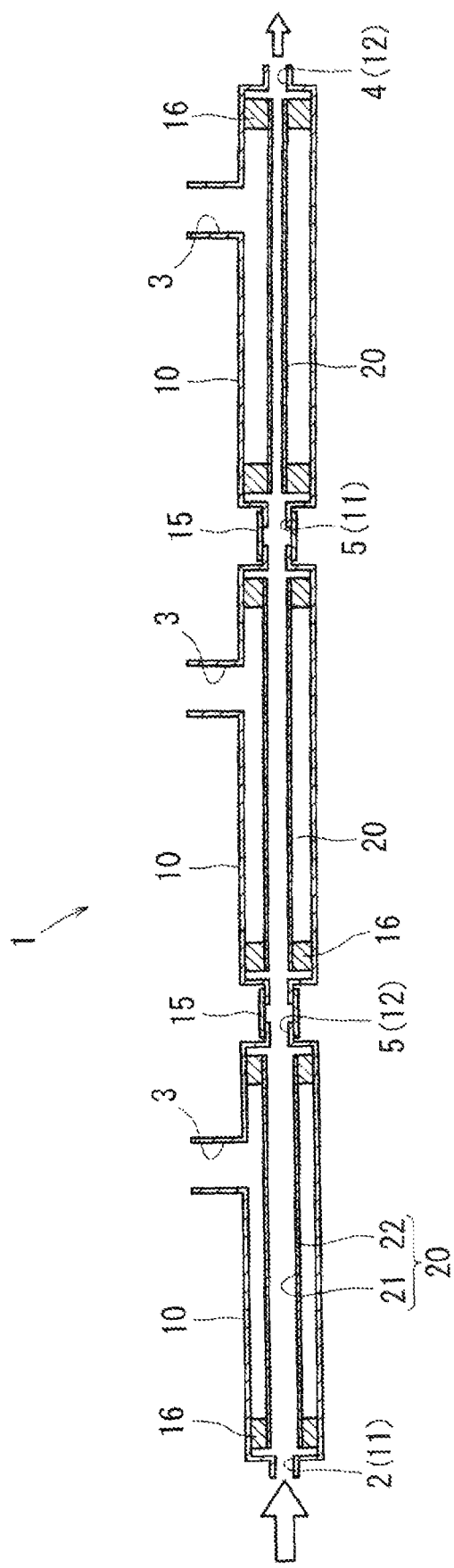
FIG. 3 is a schematic sectional view of a separation membrane module according to a third example.

FIG. 3 shows a schematic sectional view of a separation membrane module 1 according to a third example. As shown in FIG. 3, while the basic construction of the separation membrane module 1 of the third example is the same as that of the separation membrane module 1 of the first example, the inner diameter of the hollow fiber membranes 20 of each hollow case 10 is larger than the inner diameter of the hollow fiber membranes 20 of the other hollow case 10 located just on its downstream side. In other words, the inner diameter of the hollow fiber membranes 20 is gradually reduced from the upstream side (the introduction port 2 side) toward the downstream side (the discharge port 4 side). On the other hand, the number of hollow fiber membranes 20 arranged in parallel inside the hollow case 10, the thickness of the separation layers 22, and the pressure reduction force or the negative pressure are the same throughout the stages. While in FIG. 3 only one hollow fiber membrane 20 is arranged in each hollow case 10 in order to facilitate the understanding of the construction of each hollow fiber membrane 20, a plurality of hollow fiber membranes 20 are arranged in parallel in each hollow case 10 as in the first example.

In the third example, the nearer to the upstream side, the higher the concentration and flow rate of the specific component in the mixture, so that the separation efficiency per unit area can be increased. Thus, even though the inner diameter of the hollow fiber membrane 20 of each hollow case 10 is larger to some extent than that of the hollow fiber membrane 20 of the hollow case 10 located on its downstream side, it is possible to secure a necessary or desired level of separation efficiency. Thus, by setting the inner diameter of the hollow fiber membranes 20 to be gradually reduced from the upstream side toward the downstream side, it is possible to suppress pressure loss on the downstream side while securing a necessary or desired level of separation efficiency. However, the nearer to the downstream side, the lower the concentration of the specific component in the mixture, and this may cause reduction in separation efficiency. In view of this, preferably, the inner diameter of the hollow fiber membranes 20 is reduced gradually in correspondence with gradual reduction in the concentration of the specific component toward the downstream side, whereby it is possible to increase the density of the specific component in the mixture on the downstream side. As a result, it is possible to secure a necessary or desired level of separation efficiency from the introduction port 2 to the discharge port 4 of the separation membrane module 1, making it possible to efficiently separate the specific component. In other respect, this example is the same as the first example.

FOURTH EMBODIMENT

Figure 4:
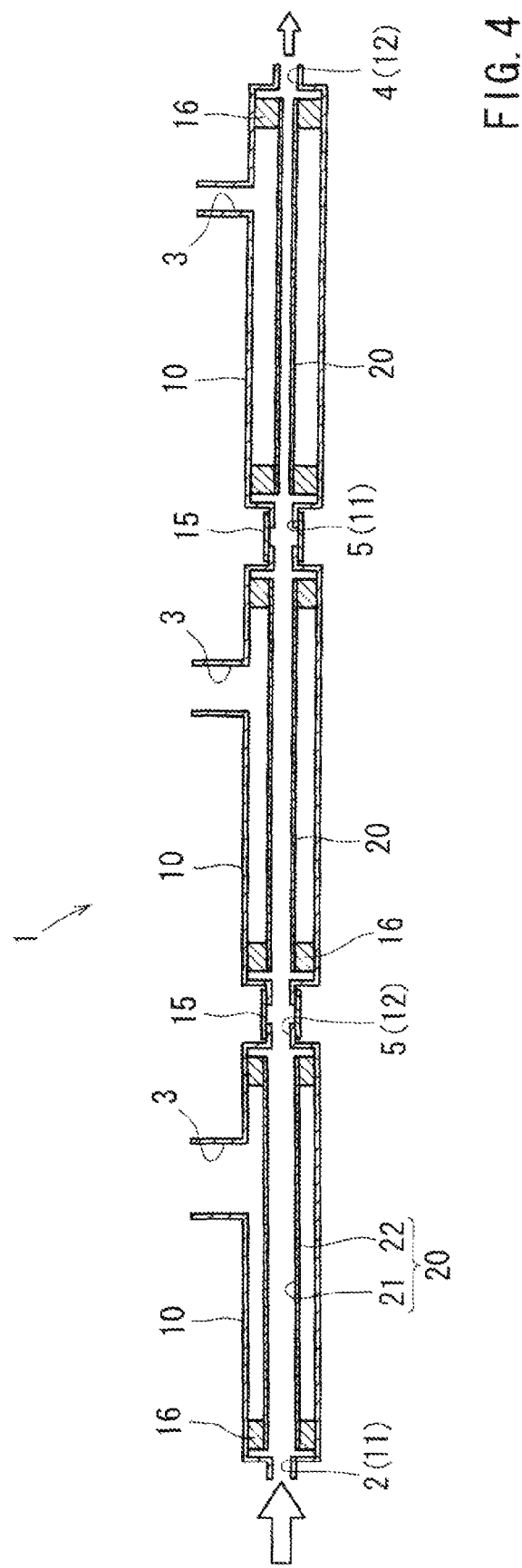
FIG. 4 is a schematic sectional view of a separation membrane module according to a fourth example.

FIG. 4 shows a schematic sectional view of a separation membrane module 1 according to a fourth example. This example is a modification of the third example and is different from the third example in that the pressure reduction force or the negative pressure in the hollow case 10 is reduced gradually in a manner similar to the second example. More specifically, as shown in FIG. 4, the inner diameter of the recovery ports 3 of the hollow cases 10 is reduced gradually. The basic construction and the operation of the separation membrane module 1 are the same as those of the first example and the third example, and the operation and advantages obtained by gradually reducing the pressure reduction force or the negative pressure in the hollow case 10 is the same as that in the second example.

FIFTH EXAMPLE

Figure 5:
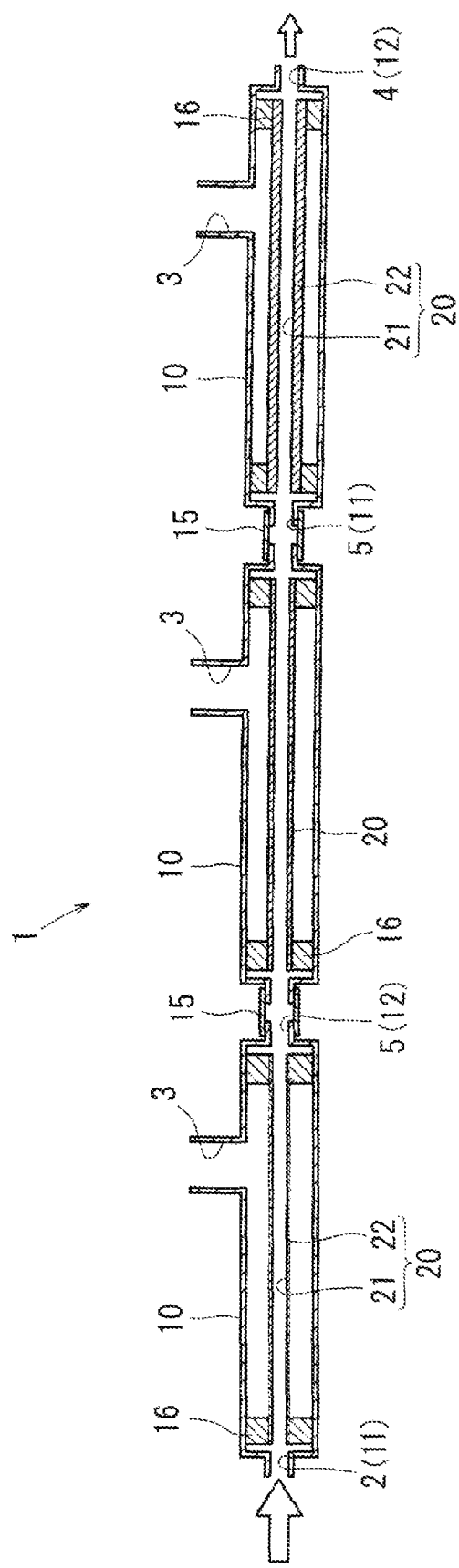
FIG. 5 is a schematic sectional view of a separation membrane module according to a fifth example.

FIG. 5 shows a schematic sectional view of a separation membrane module 1 according to a fifth example. As shown in FIG. 5, the basic construction of the separation membrane module 1 of the fifth example is the same as that of the separation membrane module 1 of the first example or the third example; it should be noted, however, that thickness of the hollow fiber membranes 20 of each hollow case 10 is smaller than the thickness of the hollow fiber membranes 20 of the other hollow case 10 located just on its downstream side. In other words, the thickness of the hollow fiber membranes in the separation stages gradually increases in the direction of flow of the mixture (from the introduction port 2 side to the discharge port 4 side). On the other hand, the number of hollow fiber membranes 20 arranged in parallel in each hollow case 10, the inner diameter thereof, and the pressure reduction forces are the same throughout the separation stages. Also in FIG. 5, to facilitate the understanding of the construction of each hollow fiber membrane 20, only one hollow fiber membrane 20 is shown to be arranged inside each hollow case 10. However, a plurality of hollow fiber membranes 20 are arranged in parallel in each hollow case 10 as in the first example or the third example.

According to the fifth example, the nearer to the upstream side, the smaller the thickness of the separation layers 22 of the hollow fiber membranes 20, so that the separation amount (transmission amount) per unit time can be increased, making it possible to quickly separate and recover the specific component. On the other hand, the concentration of the specific component in the mixture tends to be reduced toward the downstream side. In view of this, preferably, the thickness of the separation layers 22 of the hollow fiber membranes 20 increases gradually in correspondence with gradual reduction in the concentration of the specific component, so that it is possible to compensate for the reduction in separation efficiency on the downstream side. As a result, it is possible to secure a necessary or desired level of separation efficiency from the introduction port 2 to the discharge port 4 of the separation membrane module 1, making it possible to efficiently separate the specific component. In other respect, this embodiment is the same as the first example or the third example.

SIXTH EXAMPLE

Figure 6:
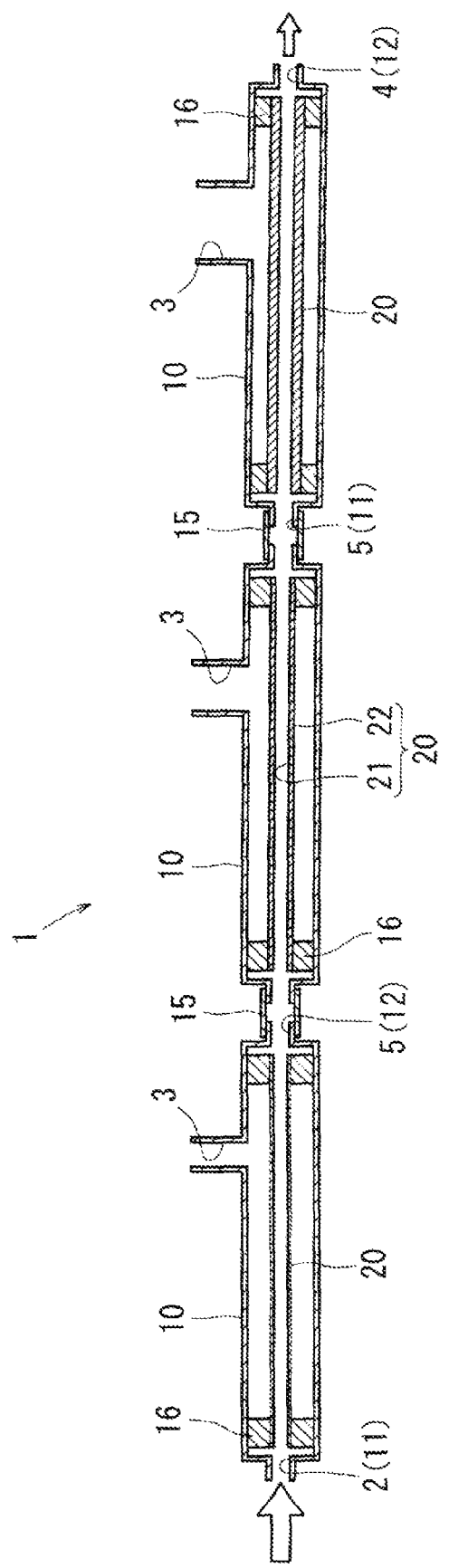
FIG. 6 is a schematic sectional view of a separation membrane module according to a sixth example.

FIG. 6 shows a schematic sectional view of a separation membrane module 1 according to a sixth example. The sixth example is a modification of the fifth example. Conversely to the second and fourth examples, in the sixth example, the pressure reduction force or the negative pressure within the hollow cases 10 or the separation stages is increased gradually. More specifically, as shown in FIG. 6, the inner diameter of the recovery port 3 of each hollow case 10 is smaller than the inner diameter of the recovery port 3 of the other hollow case 10 located directly on its downstream side. In other words, the inner diameter of the recovery ports 3 of the hollow cases 10 increases gradually in the direction of flow of the mixture through the hollow cases 10. In this construction, by increasing the pressure reduction force or the negative pressure gradually, it is possible to compensate for the reduction in transmission efficiency due to gradual increase in the thickness of the separation layers 22 of the hollow fiber membranes 20. As a result, it is possible to secure a necessary or desired level of separation efficiency from the introduction port 2 to the discharge port 4 of the separation membrane module 1, making it possible to efficiently separate the specific component. In other respect, the basic construction and operations of the sixth example are the same as effect as the first or third example.

Any of the separation membrane modules 1 of the above first to sixth examples can be used for separating a specific component from a mixed gas containing a plurality of components mixed together or from a liquid in which a gas component is dissolved by utilizing a difference in dissolution or diffusion coefficient, etc. Examples of such a mixture may include a mixed gas containing a plurality of gas components, and a liquid in which a gas component is dissolved. The separation membrane modules 1 can be applied to various gas processing apparatuses and liquid processing apparatuses, separating, for example, oxygen and nitrogen from air, separating and recovering hydrogen from the off gas in the plat forming method, separating and recovering hydrogen when synthesizing ammonium, recovering carbon dioxide and removing nitrogen oxide and sulfur oxide from the exhaust gas in thermal power generation or refuse incineration, separating and recovering carbon dioxide from the off gas of an oil field, removing acid gases such as hydrogen sulfide and carbon dioxide and separating and recovering helium from a natural gas whose main component is methane, removing moisture from air for precision machines and an ozone generator, removing water from an organic solvent, removing dissolved oxygen from water, and separating and recovering fuel vapor from a fuel vapor containing gas generated from a gasoline fuel.

An example of a fuel vapor processing apparatus incorporating the separation membrane module 1 and used for separating and recovering fuel vapor from a fuel vapor containing gas will now be described as a seventh example.

SEVENTH EXAMPLE

Figure 7:
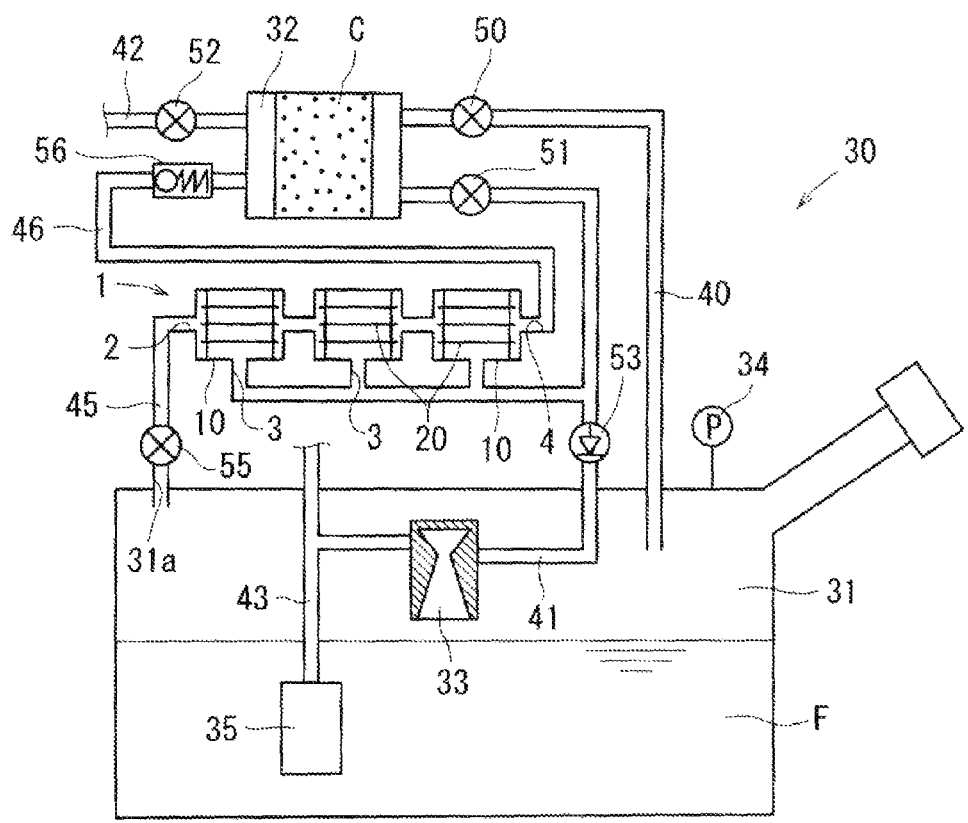
FIG. 7 is a schematic diagram illustrating an example of a fuel vapor processing apparatus.

FIG. 7 shows a seventh example, in which the separation membrane module 1 of any one of the first to sixth examples is applied to a fuel vapor processing apparatus 30. In this case, a fuel vapor containing gas in which a fuel vapor and an air component are mixed together is the mixture, and the fuel vapor is the specific component to be separated and recovered by the separation membrane module 1. Thus, in the seventh example, the separation layers 22 are formed of silicone series polymer having high selectivity and permeability with respect to hydrocarbon.

The fuel vapor processing apparatus 30 may be mounted to a vehicle, such as an automobile, for which highly volatile gasoline fuel is used. As shown in FIG. 7, the fuel vapor processing apparatus 30 has a canister 32 collecting through adsorption fuel vapor generated from a fuel tank 31, a vapor path 40 communicating between the fuel tank 31 and the canister 32, a recovery path 41 for recovering the fuel vapor separated from the canister 32 into the fuel tank 31, a pressure reduction unit 33 provided in the recovery path 41 for reducing the pressure within the canister 32 to cause desorption of the fuel vapor from the canister 32, and the separation membrane module 1 that can separate the fuel vapor from fuel vapor containing gas and recovering it into the fuel tank 31 in a condensed state. The interior of the canister 32 is filled with an adsorption material C, such as activated carbon, that can capture fuel vapor through adsorption but allows passage of air. Connected to the canister 32 is an atmosphere path 42 whose terminal end is open to the atmosphere. A pressure sensor 34 can detect the inner pressure of the fuel tank 31. A fuel pump 35 can feed under pressure fuel F stored in the fuel tank 31 to an internal combustion engine (not shown) via a fuel supply path 43. Electromagnetic valves or solenoid valves 50, 51, and 52 are provided in the vapor path 40, the recovery path 41, and the atmosphere path 42, respectively. Further, provided in the recovery path 41 is a check valve 53 preventing backflow to the canister 32 side.

Figure 8:
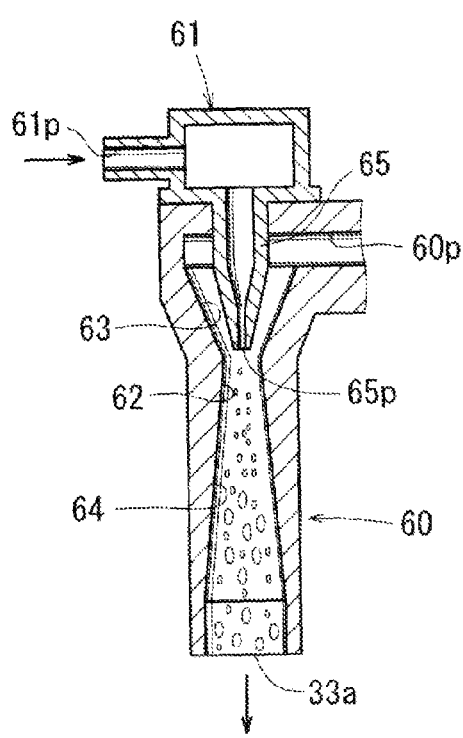
FIG. 8 is a sectional view of an aspirator.

As the pressure reduction unit 33, there is used an aspirator that can generate a negative pressure by utilizing the fuel that is supplied under pressure by the fuel pump 35. As shown in FIG. 8. the pressure reduction unit 33 (hereinafter also called "aspirator 33") is composed of a venturi portion 60 and a nozzle portion 61. The venturi portion 60 has a throttle 62, an inlet convergent portion 63 having a shape tapered toward the throttle 62 and provided on the upstream side with respect to the fuel flowing direction of the throttle 62, and an outlet divergent portion 64 having a shape tapered toward the throttle 62 and provided on the downstream side with respect to the fuel flowing direction of the throttle 62. Formed at the upstream end portion of the inlet convergent portion 63 of the venturi portion 60 is an intake port 60p to which the recovery path 41 is connected. On the other hand, the nozzle portion 61 has a nozzle main body 65 positioned coaxially within the inlet convergent portion 63 of the venturi portion 60, and an injection port 65p of the nozzle main body 65 is positioned proximal to the throttle 62 of the venturi portion 60. Further, formed at the terminal end portion of the nozzle main body 65 (i.e, the end portion on the side opposite to the injection port 65p) is a fuel introduction port 61p to which the fuel supply path 43 is connected.

A portion of the fuel F discharged from the fuel pump 35 and fed under pressure to the engine through the fuel supply path 43 is introduced into the aspirator 33 via the fuel introduction port 61p. Then, the introduced fuel F is injected from the injection port 65p of the nozzle main body 65, and flows in an axial direction at high speed through the throttle 62 of the venturi portion 60 and the central portion of the outlet divergent portion 64. As a result, a negative pressure is generated at around the throttle 62 of the venturi portion 60, and the negative pressure is applied to the recovery path 41 connected to the intake port 60p. Due to this negative pressure, reduction in pressure is effected in the canister 32 and in the separation membrane module 1 to recover the fuel vapor. The recovered fuel vapor is discharged from the discharge port 33a together with the fuel F injected from the nozzle main body 65.

In this way, the fuel vapor processing apparatus 30 of the seventh example is configured as a purge-less evaporation system in which the fuel vapor (vapor) adsorbed by the canister 32 is desorbed by the aspirator 33 serving as the pressure reduction unit. This system is different from a system in which desorption (purge) is effected by utilizing a negative pressure produced within an intake air pipe during driving of an engine drive. The apparatus 30 can be mounted to a vehicle that incorporates an idling stop system, a hybrid system, a direct injection engine, etc.

As shown in FIG. 7, the fuel tank 31 is provided with a suction port 31a for drawing fuel vapor that may be generated in the fuel tank 31 while fuel vapor is being desorbed and recovered from the canister 32. The introduction port 2 of the separation membrane module 1 communicates with the suction port 31 a. The recovery ports 3 of the separation membrane module 1 communicate with the recovery path 41. The discharge port 4 of the separation membrane module 1 communicates with the canister 32. An electromagnetic valve (solenoid valve) 55 is also provided in the introduction path 45 connecting between the suction port 31a of the fuel tank 31 and the introduction port 2 of the separation membrane module 1. Further, in the discharge path 46 connecting between the discharge port 4 of the separation membrane module 1 and the canister 32, there is provided a pressure regulating valve 56 permitting only the flow from the separation membrane module 1 to the canister 32 side when a predetermined pressure is applied. The opening/closing timing of each of the electromagnetic valves (solenoid valves) 50, 51, 52, and 55 is controlled by an ECU (not shown).

Next, the operation of the fuel vapor processing apparatus 30 will be described. When the vehicle is stopped, the electromagnetic valves 50 and 52 are opened whereas the electromagnetic valves 51 and 55 are closed. Thus, when the vehicle is stopped or at the time of filling supply into the fuel tank, fuel vapor generated in the fuel tank 31 is introduced into the canister 32 through the vapor path 40. Then, in the canister 32, the fuel vapor is captured through adsorption by the adsorbing material C, whereas the air component is dissipated into the atmosphere through the atmosphere path 42. As a result, the fuel vapor is prevented from being dissipated into the atmosphere. Due to the provision of the pressure regulating valve 56, which also functions as a one-way valve, the air component is prevented from flowing from the discharge path 46 toward the separation membrane module 1.

When an internal combustion engine starting switch such as an ignition switch (IG switch) or a starter is turned on, the electromagnetic valves 50 and 52 are closed, whereas the electromagnetic valves 51 and 55 are opened. Further, the fuel pump 35 is driven. Then, as the fuel F is fed under pressure from the fuel pump 35 through the fuel supply path 45, reduction in pressure is effected in the canister 32 and each hollow case 10 of the separation membrane module 1 by the aspirator 33. And, through the reduction in pressure in the canister 32, the fuel vapor that has been adsorbed by the adsorbing material C is desorbed, and recovered in the fuel tank 31 through the recovery path 41.

However, even during the recovery of the fuel vapor that has been adsorbed by the canister 32, fuel vapor may still be generated in the fuel tank 31. The fuel vapor thus generated in the fuel tank 31 is passed through the introduction path 45 from the suction port 31a of the fuel tank 31 and is introduced into the separation membrane module 1 through the introduction port 2. Then, solely the fuel vapor in the fuel vapor containing gas is separated gradually by the hollow fiber membranes 20, and the fuel vapor separated at each stage is efficiently recovered in the fuel tank 31 from each recovery port 3 via the recover path 41 and the aspirator 33. During this process, the interior of the separation membrane module 1 is reduced in pressure due to the negative pressure of the aspirator 33, so that the fuel vapor is efficiently separated. On the other hand, the air component that has passed through the separation membrane module 1 is introduced into the canister 32 from the discharge port 4 via the discharge path 46, and is utilized as a gas for desorbing the fuel vapor from the canister 32. Due to the pressure regulating valve 56 in the discharge path 46, the interior of each hollow fiber membrane 20 is maintained to have a positive pressure, and the interior of the canister 32 is maintained to have a negative pressure. When the ignition switch or the like is turned off to halt the vehicle, the electromagnetic valves 50 and 52 are opened again, whereas the electromagnetic valves 51 and 55 are closed. As the fuel pump 35 is stopped, a possibility may exist to cause back flow of a gas or fuel F from the aspirator 33 toward the canister 32 and the separation membrane module 1. However, due to the one-way valve 53 in the recovery path 41, such back flow is prevented.

In this way, according to the fuel vapor processing apparatus 30 of the seventh example, the number of hollow fiber membranes 20 arranged in parallel is reduced gradually, or the inner diameter of the hollow fiber membranes 20 is reduced gradually, or the thickness of the separation layers 22 of the hollow fiber membranes 20 is increased gradually, or the inner diameter of each recovery port 3 is varied to change the pressure reduction force gradually according to these characteristics as appropriate, whereby it is possible to efficiently recover the fuel vapor generated again in the fuel tank 31 while using the air inside the fuel tank 31 for desorption at the canister 32.

OTHER POSSIBLE MODIFICATIONS

In the case of the second, fourth and sixth examples, in which the pressure reduction force in the hollow cases 10 is varied gradually, in place of varying the inner diameter of the recovery port 3 of each hollow case 10, it is possible to provide a pressure regulating valve in each of the recovery ports 3 having the same inner diameter. Further, it is possible to provide the pressure reduction units in the same number as that of the recovery ports 3 (hollow cases 10), in order to vary gradually the pressure reduction force (drive force) produced by the pressure reduction units, although this may lead to increase in the size of the apparatus.

Further, as the pressure reduction unit, it is also possible to use a vacuum pump or the like in place of the aspirator. Thus, the separation membrane module 1 is also applicable, for example, to fuel vapor apparatuses as discussed in Japanese Laid-Open Patent Publication Nos. 2004-50042 and 2004-324488.

What is claimed is:

1. A separation membrane module for separating a specific component from a mixture containing a plurality of components, comprising:
   a plurality of separation stages each including a plurality of hollow fiber membranes arranged in parallel to each other;
   wherein the separation stages are connected in series via at least one connection portion allowing passage of the mixture,
   wherein the mixture is successively introduced into a hollow portion of each hollow fiber membrane of each separation stage, so that the specific component is separated from the mixture as the specific component transmits through each hollow fiber membrane from an interior to an exterior of each hollow fiber membrane,
   wherein the number of the hollow fiber membranes of each separation stage is determined to be larger than the number of the hollow fiber membranes of the other separation stage located just on its downstream side with respect to a direction of flow of the mixture through the separation stages; and
   wherein a negative pressure is applied to the exterior of the hollow fiber membranes of each separation stage and is determined to be larger than the negative pressure applied to the exterior of the hollow fiber membranes of the other separation stage located just on its downstream side.

2. The separation membrane module as in claim 1, wherein each of the separation stages includes a hollow case for containing the hollow fiber membranes therein.

3. A separation membrane module for separating a specific component from a mixture containing a plurality of components, comprising:
   a plurality of separation stages each including a plurality of hollow fiber membranes arranged in parallel to each other;
   wherein the separation stages are connected in series via at least one connection portion allowing passage of the mixture,
   wherein the mixture is successively introduced into a hollow portion of each hollow fiber membrane of each separation stage, so that the specific component is separated from the mixture as the specific component transmits through each hollow fiber membrane from an interior to an exterior of each hollow fiber membrane,
   wherein the number of the hollow fiber membranes of each separation stage is determined to be larger than the number of the hollow fiber membranes of the other separation stage located just on its downstream side with respect to a direction of flow of the mixture through the separation stages; and
   wherein the mixture contains fuel vapor and air, and the specific component is the fuel vapor.

4. A fuel vapor processing apparatus comprising:
   a canister capable of adsorbing fuel vapor generated in a fuel tank;
   a vapor path communicating between the fuel tank and the canister;
   a recovery path for recovering fuel vapor desorbed from the canister into the fuel tank; and
   a pressure reduction unit provided in the recovery path and configured to reduce pressure within the canister for desorbing the fuel vapor from the canister; and
   a separation membrane module for separating a specific component from a mixture containing a plurality of components, comprising;
   wherein the separation membrane module separates fuel vapor as the specific component from a fuel vapor containing air, so that the fuel vapor is recovered into the fuel tank in a condensed state, and
   wherein the separation membrane module comprises:
   a plurality of separation stages each including a plurality of hollow fiber membranes arranged in parallel to each other;
   wherein the separation stages are connected in series via at least one connection portion allowing passage of the mixture,
   wherein the mixture is successively introduced into a hollow portion of each hollow fiber membrane of each separation stage, so that the specific component is separated from the mixture as the specific component transmits through each hollow fiber membrane from an interior to an exterior of each hollow fiber membrane,
   wherein the number of the hollow fiber membranes of each separation stage is determined to be larger than the number of the hollow fiber membranes of the other separation stage located just on its downstream side with respect to a direction of flow of the mixture through the separation stages.

5. The fuel vapor processing apparatus as in claim 4, wherein:
the fuel tank is provided with a suction port for introducing fuel vapor generated in the fuel tank while fuel vapor is being desorbed from the canister,
the separation membrane module includes an introduction port through which a fuel vapor containing air is introduced, a recovery port for recovering the fuel vapor separated by the hollow fiber membranes, and a discharge port for discharging a residual air component that has not been transmitted through the hollow fiber membranes,
the introduction port of the separation membrane module communicates with the suction port,
the recovery port of the separation membrane module communicates with the recovery path,
the discharge port of the separation membrane module communicates with the canister, and
the fuel vapor separated by the separation membrane module is recovered in the fuel tank via the recovery path while a pressure reduction force of the pressure reduction unit is applied to the exterior of each hollow fiber membrane of the separation membrane module, whereas the air component discharged from the discharge port of the separation membrane module is supplied to the canister.

* * * * *

UNITED STATES PATENT AND TRADEMARK OFFICE
CERTIFICATE OF CORRECTION

PATENT NO. : 8,523,982 B2
APPLICATION NO. : 12/958562
DATED : September 3, 2013
INVENTOR(S) : Suefuji et al.

It is certified that error appears in the above-identified patent and that said Letters Patent is hereby corrected as shown below:

Title Page
Assignee should read:
--(73) Assignee: AISAN KOGYO KABUSHIKI KAISHA, Obu-shi (JP)
 ASAHI KASEI CHEMICALS CORPORATION, Tokyo, (JP)--.

Signed and Sealed this
Twenty-fifth Day of February, 2014

Michelle K. Lee
*Deputy Director of the United States Patent and Trademark Office*